United States Patent
Ito

(10) Patent No.: US 8,126,945 B2
(45) Date of Patent: Feb. 28, 2012

(54) DATA MANAGEMENT APPARATUS FOR GENERATING ONE FILE HAVING COMBINATION OF PLURALITY OF FILES, DATA MANAGEMENT METHOD, AND DATA MANAGEMENT PROGRAM

(75) Inventor: Atsushi Ito, Yawata (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 545 days.

(21) Appl. No.: 12/025,992

(22) Filed: Feb. 5, 2008

(65) Prior Publication Data

US 2008/0196028 A1      Aug. 14, 2008

(30) Foreign Application Priority Data

Feb. 9, 2007   (JP) .................. 2007-030778

(51) Int. Cl.
    G06F 15/00     (2006.01)
    G06F 15/16     (2006.01)
(52) U.S. Cl. ....... 707/915; 358/1.14; 358/1.15; 709/219
(58) Field of Classification Search .................. 707/705, 707/915; 358/1.15, 1.18, 1.14; 709/219, 709/203
    See application file for complete search history.

(56) References Cited

U.S. PATENT DOCUMENTS

| | | | | |
|---|---|---|---|---|
| 5,467,434 A * | 11/1995 | Hower et al. | ................. | 358/1.15 |
| 6,614,546 B1 * | 9/2003 | Kurozasa | ..................... | 358/1.15 |
| 7,031,014 B2 * | 4/2006 | Ohwa | .......................... | 358/1.18 |
| 7,295,351 B2 * | 11/2007 | Hagiwara | ..................... | 358/401 |
| 7,584,246 B2 * | 9/2009 | Yokokura | ..................... | 715/736 |
| 7,673,008 B2 * | 3/2010 | Kojima | ........................ | 709/208 |
| 2005/0289512 A1 | 12/2005 | Matsusaka | | |
| 2006/0048043 A1 | 3/2006 | Kikuchi | | |
| 2006/0087681 A1 * | 4/2006 | Iwamoto et al. | ............. | 358/1.15 |
| 2006/0170948 A1 | 8/2006 | Kobashi | | |
| 2006/0190521 A1 * | 8/2006 | Kojima | ........................ | 709/200 |
| 2006/0190553 A1 * | 8/2006 | Kojima | ........................ | 709/216 |
| 2007/0168881 A1 * | 7/2007 | Nagoshi et al. | ............... | 715/810 |

FOREIGN PATENT DOCUMENTS

| | | |
|---|---|---|
| JP | 2000-155731 | 6/2000 |
| JP | 2001-195292 | 7/2001 |
| JP | 2003-084941 | 3/2003 |
| JP | 2004-021390 A | 1/2004 |
| JP | 2005-148828 | 6/2005 |
| JP | 2006-011936 | 1/2006 |
| JP | 2006-065804 | 3/2006 |
| JP | 2006-215819 | 8/2006 |

OTHER PUBLICATIONS

Decision of Rejection in JP 2007-030778 dated Dec. 9, 2008, and an English Translation thereof.
Notice of Allowance in JP 2007-030778 dated Apr. 7, 2009, and an English Translation thereof.
Notice of Ground of Rejection in JP 2007-030778 dated Sep. 9, 2008, with English Translation thereof.

* cited by examiner

Primary Examiner — Vincent Boccio
(74) Attorney, Agent, or Firm — Buchanan Ingersoll & Rooney PC

(57) ABSTRACT

In order to reduce the volume of data having combination of a plurality of data, MFP includes an element determination portion to determine at least one of a plurality of files stored beforehand as an element, an ordinal rank determination portion to determine an ordinal rank of the determined at least one element, and a combined data generation portion to generate and store combined data including link information for specifying at least part of each of determined at least one element and defining an ordinal rank of the link information.

20 Claims, 14 Drawing Sheets

F I G. 1
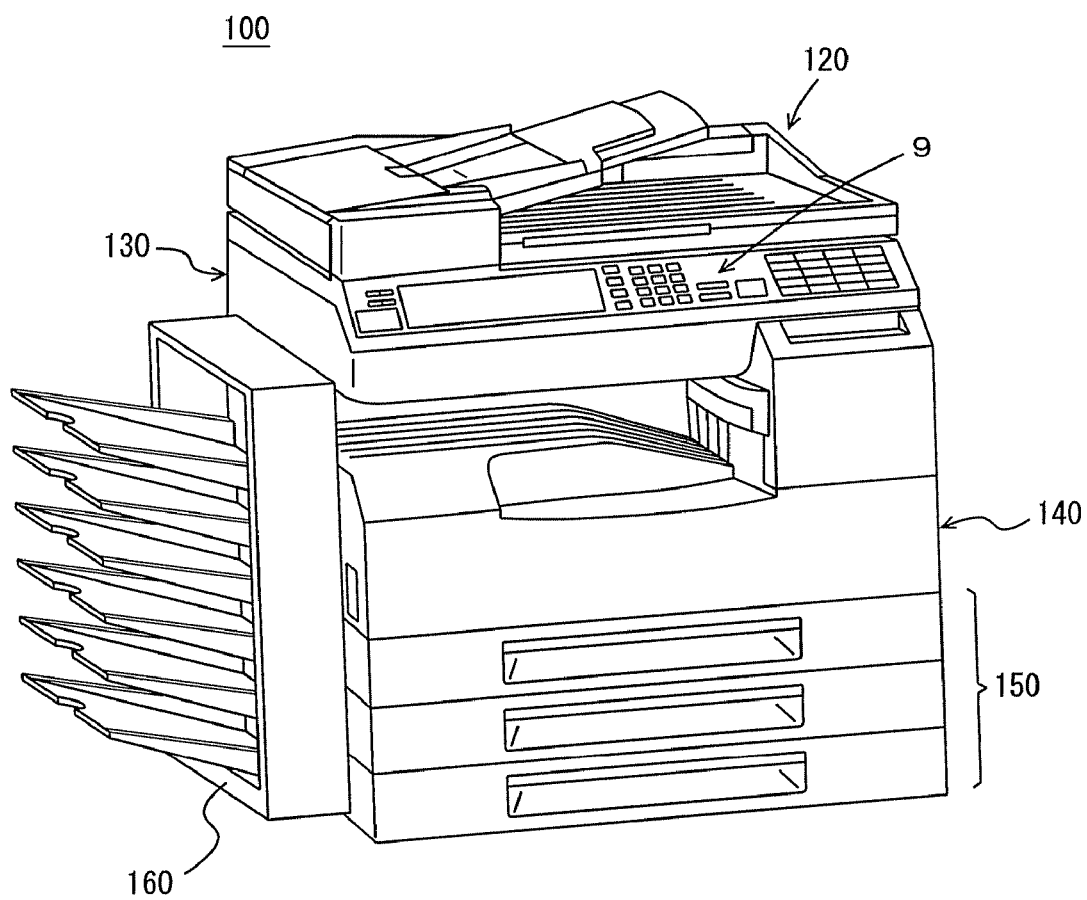

F I G. 4

JOB TICKET

| PRINT CONDITION | INHERITANCE FLAG |

FIG. 5

COMBINED DATA

| USER IDENTIFICATION INFORMATION | LINK INFORMATION 1 | ORDINAL RANK | LINK INFORMATION 2 | ORDINAL RANK | ... | LINK INFORMATION N | ORDINAL RANK |
|---|---|---|---|---|---|---|---|

FIG. 6  LINK INFORMATION

| FILE IDENTIFICATION INFORMATION | LOCATION INFORMATION |
|---|---|
| FILE NAME | CHAPTER NUMBER |

F I G. 1 3

| PRINT CONDITION SETTING | |
|---|---|
| DOCUMENT NAME: | 060919 NATIONAL LANGUAGE |

PRINT CONDITION:

| ITEM | SETTING VALUE |
|---|---|
| PRINTING TYPE | DOUBLE-SIDED |
| STAPLING | OFF |
| PUNCHING | OFF |
| FOLD | OFF |
| PERFECT BINDING | OFF |

INHERITANCE OF PRINT CONDITION:
● INHERIT  ○ DISCARD

[ OK ]  [ Cancel ]

F I G. 1 6

| PRINT CONDITION ALL ITEMS SETTING | |
|---|---|
| LINK INFORMATION NAME: | 060919 SCIENCE |

PRINT CONDITION:

| ITEM | SETTING VALUE |
|---|---|
| PRINTING TYPE | DOUBLE-SIDED |
| STAPLING | OFF |
| PUNCHING | OFF |
| FOLD | OFF |
| PERFECT BINDING | OFF |

OK    Cancel

DATA MANAGEMENT APPARATUS FOR GENERATING ONE FILE HAVING COMBINATION OF PLURALITY OF FILES, DATA MANAGEMENT METHOD, AND DATA MANAGEMENT PROGRAM

This application is based on Japanese Patent Application No. 2007-30778 filed with Japan Patent Office on Feb. 9, 2007, the entire content of which is hereby incorporated by reference.

BACKGROUND OF THE INVENTION

1. Field of the Invention

The present invention relates to a data management apparatus, a data management method, and a data management program, and more particularly to a data management apparatus for generating one file having combination of a plurality of files, a data management method, and a data management program.

2. Description of the Related Art

Recently, an image forming apparatus such as a digital copier includes a storage device such as a hard disk drive (referred to as "HDD" hereinafter) for storing data. Since HDD can store many files, a variety of techniques for managing files have been developed.

Japanese Laid-Open Patent Publication No. 2004-21390 discloses an image forming apparatus having a box combination saving function of putting a plurality of jobs together and setting a new processing mode to be stored again in an image memory. However, if combined data is generated by combining original data themselves, the combined data itself has to be changed. In a case where the combined data has many pages, it is difficult to specify the location of a change. On the other hand, if combined data is generated independent of original data, a change made in the original data is not reflected in the combined data so that the combined data has to be changed independently of the change made in the original data. Moreover, if original data is used for a plurality of combined data, a change made in the original data has to be reflected in each of a plurality of combined data. Therefore, all of a plurality of combined data have to be generated again, or the same change has to be made for each, resulting in complicated management.

SUMMARY OF THE INVENTION

The present invention is made to solve the aforementioned problem. An object of the present invention is to provide a data management apparatus allowing data volume of combination of a plurality of data to be reduced, a data management system, and a data management program.

Another object of the present invention is to provide a data management apparatus allowing data to be readily changed, a data management method, and a data management program.

In order to achieve the aforementioned object, in accordance with an aspect of the present invention, a data management apparatus includes: an element determination portion to determine a plurality of data stored beforehand, as element data; an ordinal rank determination portion to determine ordinal ranks of the determined plurality of element data; and a combined data generation portion to generate and store combined data which includes link information for specifying at least part of each of the determined plurality of element data and defines an ordinal rank of the link information.

According to this aspect, such combined data is stored that includes identification information for specifying at least part of each of at least one element data of a plurality of data stored beforehand and defines the ordinal rank of the identification information. Therefore, the part specified by the identification information is read according to the ordinal rank defined by the combined data, so that any data can be output from a plurality of data in any given order. Since the combined data does not include real data, the amount of data can be reduced. Therefore, it is possible to provide a data management apparatus that allows the volume of data having a plurality of data combined to be reduced. In addition, since combined data is changed when data is changed, the operation for data update becomes easy. Therefore, it is possible to provide a data management apparatus that allows data to be readily changed.

In accordance with another aspect of the present invention, a data management method includes the steps of: determining a plurality of data stored beforehand, as element data; determining ordinal ranks of the determined plurality of element data; generating combined data which includes link information for specifying at least part of each of the determined plurality of element data and defines an ordinal rank of the link information; storing said combined data; and reading and outputting a part specified by the link information from the plurality of element data, according to an ordinal rank defined by the combined data, when the stored combined data is designated.

According to this aspect, it is possible to provide a data management method that allows the volume of data having a plurality of data combined to be reduced. It is also possible to provide a data management method that allows data to be readily changed.

In accordance with a further aspect of the present invention, a data management program embodied on a computer readable medium causes a computer to execute processing including the steps of: determining a plurality of data stored beforehand, as element data; determining ordinal ranks of the determined plurality of element data; generating combined data which includes link information for specifying at least part of each of the determined plurality of element data and defines an ordinal rank of the link information; storing the combined data; and reading and outputting a part specified by the link information from the plurality of element data, according to an ordinal rank defined by the combined data, when the stored combined data is designated.

According to this aspect, it is possible to provide a data management program that allows the volume of data having a plurality of data combined to be reduced. It is also possible to provide a data management program that allows data to be readily changed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external perspective view of a MFP.

FIG. 4 shows an exemplary format of a job ticket.

FIG. 5 shows an exemplary format of combined data.

FIG. 6 shows an exemplary configuration of link information.

FIG. 13 shows an exemplary setting dialog box.

FIG. 16 shows an exemplary setting dialog box for setting all items.

DESCRIPTION OF THE PREFERRED EMBODIMENTS

Figure 2:
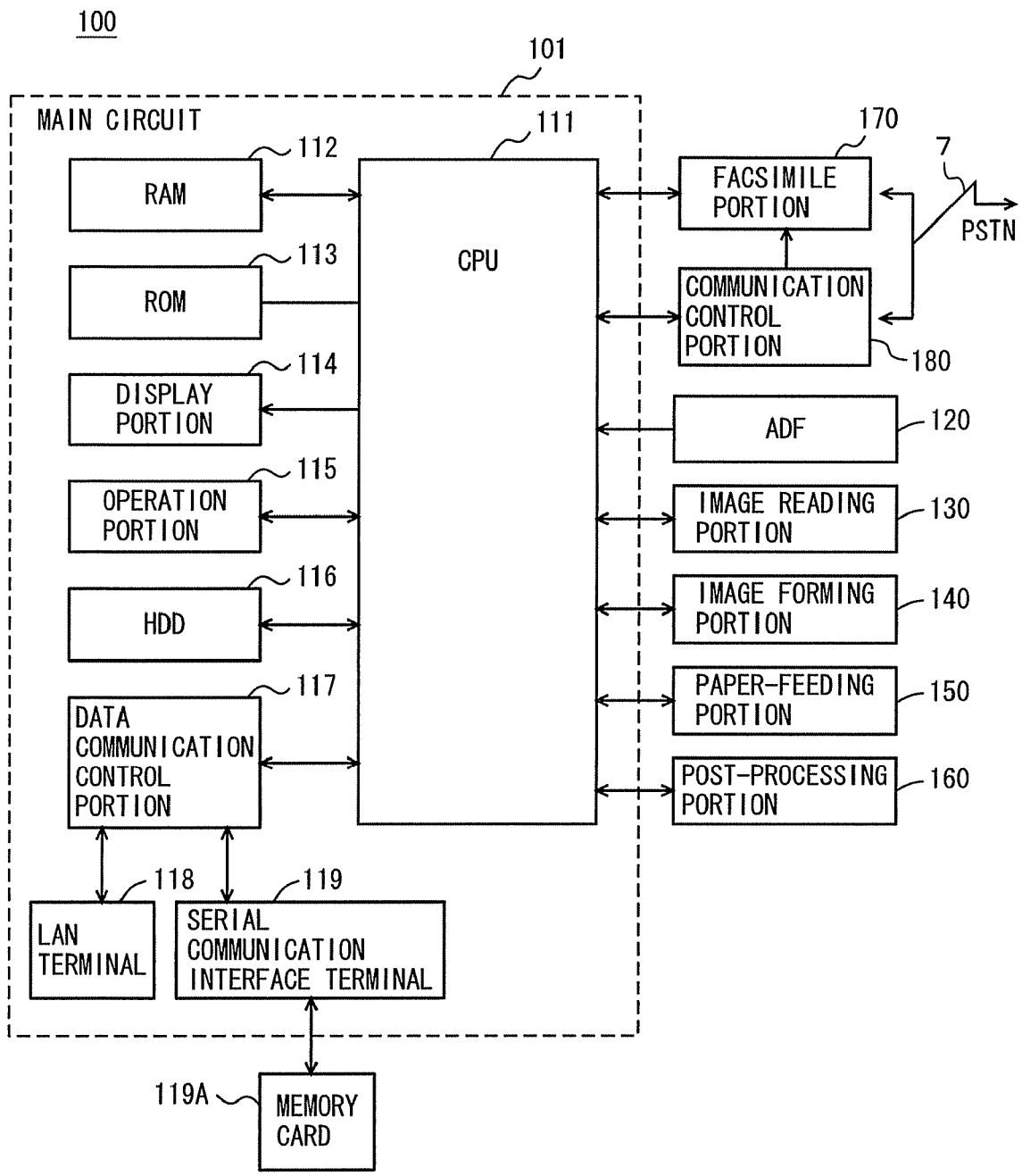
FIG. 2 is a block diagram showing an exemplary circuit configuration of MFP.

In the following, an embodiment of the present invention will be described with reference to the figures. In the following description, the same parts are denoted with the same reference characters. Their names and functions are also the same. Therefore, a detailed description thereof will not be repeated.

In the present embodiment, MFP (Multi Function Peripheral) which is a digital multifunction machine will be described as an example of data management apparatus. FIG. 1 is an external perspective view of MFP. Referring to FIG. 1, MFP 100 includes an automatic document feeder (ADF) 120, an image reading portion 130, an image forming portion 140, a paper-feeding portion 150, and a post-processing portion 160.

ADF 120 automatically conveys a document including a plurality of sheets of paper set on a document-feeding tray one by one to a prescribed document reading position set on a platen glass of image reading portion 130 and discharges the document having the document image read by image reading portion 130 onto a document-discharge tray. Image reading portion 130 includes a light source applying light to the document conveyed to the document reading position and a photoelectric transducer receiving light reflected on the document to scan a document image according to the size of the document. The photoelectric transducer converts the received light to image data as an electrical signal for output to image forming portion 140. Paper-feeding portion 150 conveys a sheet of paper stored in the paper-feeding tray to image forming portion 140.

Image forming portion 140, which forms an image by a well-known electrophotographic technique, performs a variety of data processing such as shading correction on the image data input from image reading portion 130 and forms an image on a sheet of paper conveyed by paper-feeding portion 150 based on the processed image data.

Post-processing portion 160 discharges a recording sheet having an image formed thereon. Post-processing portion 160 has a plurality of paper-discharge trays and allows sheets of paper having images formed thereon to be sorted and discharged. Post-processing portion 160 additionally includes a punched hole processing portion and a stapling processing portion to perform punched hole processing or stapling processing on the discharged sheet. MFP 100 also includes an operation panel 9 on the top, as a user interface with a user.

It is noted that although in the present embodiment, MFP 100 will be described as an exemplary data management apparatus, not only MPF 100 but also, for example, a scanner, a printer, a facsimile, a personal computer, or the like may be used as long as the apparatus can store and process a plurality of data.

FIG. 2 is a block diagram showing an exemplary circuit configuration of MFP. Referring to FIG. 2, MFP 100 includes a main circuit 101, which is connected to automatic document feeder (ADF) 120, image reading portion 130, image forming portion 140, paper-feeding portion 150, post-processing portion 160, facsimile portion 170, and a communication control portion 180.

Main circuit 101 includes a central processing unit (CPU) 111, a RAM (Random Access Memory) 112 used as a work area for CPU 111, a ROM (Read Only Memory) 113 for storing a program and the like executed by CPU 111, a display portion 114, an operation portion 115, a hard disk drive (HDD) 116 as a mass storage device, and a data communication control portion 117.

CPU 111 is connected to each of display portion 114, operation portion 115, HDD 116, and data communication control portion 117 to control main circuit 101 as a whole. CPU 111 is also connected to each of facsimile portion 170, communication control portion 180, ADF 120, image reading portion 130, image forming portion 140, paper-feeding portion 150, and post-processing portion 160 to control MFP 100 as a whole.

Display portion 114 is a display such as a liquid crystal display (LCD) or an organic ELD (Electro Luminescence Display) to display instruction menus for a user, information concerning the captured image data, and the like. Operation portion 115 has a plurality of keys to accept inputs of a variety of instructions and data such as characters and numerals by the user's operation corresponding to keys. Operation portion 115 includes a touch panel provided on display portion 114. Display portion 114 and operation portion 115 constitute operation panel 9 provided on the top surface of MFP 100.

Data communication control portion 117 includes a LAN terminal 118 which is an interface for communication via a communication protocol such as TCP (Transmission Control Protocol) or FTP (File Transfer Protocol), and a serial communication interface terminal 119 for serial communication. Data communication control portion 117 transmits/receives data to/from external equipment connected to LAN terminal 118 or serial communication interface terminal 119, according to an instruction from CPU 111.

When a LAN cable for connecting to a network 2 is connected to LAN terminal 118, data communication control portion 117 communicates with any other MFP or computer connected through LAN terminal 118. Data communication control portion 117 additionally communicates with any other computer connected to the Internet.

When equipment is connected to serial communication interface terminal 119, data communication control portion 117 communicates with the equipment connected to serial communication interface terminal 119, for example, a digital camera, a digital video camera, or a mobile information terminal for input/output of image data. A memory card 119A containing a flash memory can also be connected to serial communication interface terminal 119. CPU 111 controls data communication control portion 117 to read a data management program to be executed by CPU 111 from memory card 119A and stores the read data management program into RAM 112 for execution.

Here, a recording medium having the data management program stored therein to be executed by CPU 111 is not limited to memory card 119A and may be a medium such as a flexible disk, a cassette tape, an optical disk (CD-ROM (Compact Disc-Read Only Memory)/MO (Magnetic Optical Disc/MD (Mini Disc)/DVD (Digital Versatile Disc)), an IC card (including a memory card), an optical card, or a semiconductor memory such as a mask ROM, EPROM (Erasable Programmable ROM), or EEPROM (Electronically EPROM). Alternatively, CPU 111 may download and store a data management program from a computer connected to the Internet into HDD 116, or a computer connected to the Internet may write a data management program into HDD 116, so that the data management program stored in HDD 116 may be loaded into RAM 112 and executed by CPU 111. The program referred to herein includes not only a program directly executable by CPU 111 but also a source program, a compressed program, an encrypted program, and the like.

Communication control portion 180 is a modem for connecting CPU 111 to PSTN 7. A telephone number in PSTN 7 is allotted beforehand to MFP 100. When a call is placed from a facsimile machine connected to PSTN 7 to the telephone number allotted to MFP 100, communication control portion 180 detects the call. Upon detection of the call, communication control portion 180 establishes a call to allow facsimile portion 170 to communicate.

Facsimile portion 170 is connected to PSTN 7 to transmit facsimile data to PSTN 7 or receive facsimile data from PSTN 7.

Data is input to MFP 100 (1) when image data is input by reading a document at image reading portion 130, (2) when image data is received from any other computer or MFP connected to a network through data communication control portion 117, (3) when image data stored in memory card 119A is read out through data communication control portion 117, and (4) when facsimile data is received at facsimile portion 170. Data input to MFP 100 is provided with a file name and stored in a prescribed region of HDD 116.

Data is output from MFP 100 when the data stored in HDD 116 is (1) visualized on a recording medium such as paper by image forming portion 140, (2) transmitted to any other computer or MFP connected to a network through data communication control portion 117, (3) stored in memory card 119A, (4) output as facsimile data from facsimile portion 170, and (5) displayed on display portion 114.

HDD 116 includes a plurality of storage regions. Each of a plurality of regions is referred to as BOX here. BOX includes a personal BOX and a shared BOX. The personal BOX is a storage region which is allotted to each of a plurality of users registered as users who use MFP 100 and is accessible only by the user. The shared BOX is a storage region allotted to more than one users of a plurality of users and is accessible by all of more than one users.

Figure 3:
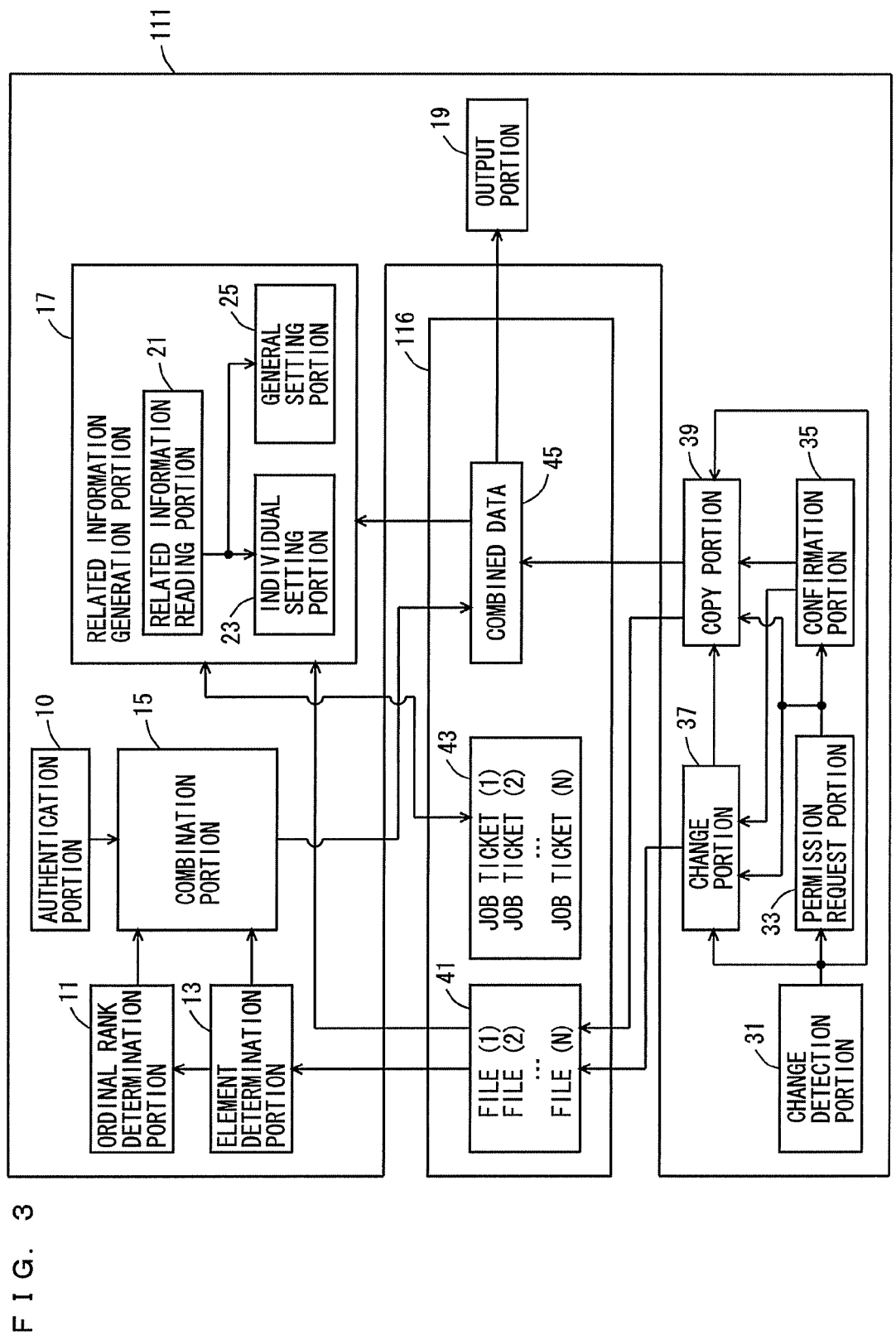
FIG. 3 is a functional block diagram showing an overall function of CPU together with data stored in HDD.

FIG. 3 is a functional block diagram showing an overall function of CPU together with data stored in HDD. Referring to FIG. 3, a file group 41 including a plurality of files and a job ticket group 43 including a plurality of job tickets are stored in HDD 116. Each of a plurality of files included in file group 41 stored in HDD 116 corresponds to one of a plurality of job tickets included in job ticket group 43. In other words, a plurality of job tickets respectively corresponding to a plurality of files are stored in HDD 116.

FIG. 4 shows an exemplary format of a job ticket. Referring to FIG. 4, a job ticket includes a print condition and an inheritance flag. The print condition includes a setting value for printing a file corresponding to a job ticket. The inheritance flag defines whether or not a print condition is valid in combined data. The inheritance flag is set to either inherit or discard. A job ticket having the inheritance flag set to inherit indicates that the print condition is set valid in combined data. A job ticket having the inheritance flag set to discard indicates that the print condition is set invalid in combined data.

Returning to FIG. 3, CPU 111 includes an authentication portion 10 for authenticating an operator of MFP 100, an element determination portion 13 for determining an original file to be combined as an element of combined data, an ordinal rank determination portion 11 for determining ordinal ranks of elements, a combination portion 15 for generating combined data from elements and ordinal ranks, an output portion 19 for outputting data, a related information generation portion 17 for generating related information corresponding to combined data, a change detection portion 31 for detecting changes on a plurality of files included in file group 41, a permission request portion 33 requesting an administrator of combined data for permission to change, a confirmation portion 35 for confirming whether to change or not, a change portion 37 changing data, and a copy portion 39 generating a copy of data.

Authentication portion 10 authenticates a user operating MFP 100. A user is authenticated, for example, by user identification information such as a user name and a password. If user authentication is successful, authentication portion 10 validates an instruction subsequently input to operation portion 115. If user authentication is failed, authentication portion 10 invalidates an instruction subsequently input to operation portion 115. Accordingly, the user identification information of an operator who gives an instruction to generate combined data can be obtained. When user authentication is successful, authentication portion 10 outputs user identification information to combination portion 15.

Element determination portion 13 determines an element to be combined. An element is the whole or a part of one file of a plurality of file (1)-file (N) that constitute file group 41 stored in HDD 116. An element is determined by the user of MFP 100 specifying one from a plurality of files stored in HDD 116 and designating the whole or part thereof. Specifically, element determination portion 13 displays a list window including a list of file names on display portion 114 and, when the user specifies the desired file name from the displayed list by operation portion 115, accepts the specified file name from operation portion 115. In the case where a part of a file is designated, when a file identified by a file name is read and displayed on display portion 114 and the user specifies a part to be designated as an element by operation portion 115, the specified part is accepted from operation portion 115. Element determination portion 13 outputs the accepted file name and the location information of the part to combination portion 15. In the case where the whole of a file is specified, a mark indicating the whole is set in the location information.

Ordinal rank determination portion 11 determines the ordinal ranks of a plurality of elements determined by element determination portion 13. Specifically, file names of data (files) including a plurality of elements determined by element determination portion 13 are displayed in a list on display portion 114, and when the user inputs to operation portion 115 an instruction to change the order in which a plurality of file names displayed in a list are arranged, the arrangement order is changed. A file name is selected by a cursor key and a determination key included in operation portion 115 so that the arrangement order of selected file names can be changed by pressing the cursor key. Then, the arrangement order of file names which is finally determined by the user is accepted from operation portion 115. Ordinal rank determination portion 11 determines the ordinal ranks of a plurality of elements from the arrangement order of a plurality of file names and outputs the determined ordinal ranks to combination portion 15.

Combination portion 15 generates combined data from a plurality of elements input from element determination portion 13, the ordinal ranks of a plurality of elements input from ordinal rank determination portion 11, and user identification information input from authentication portion 10, and stores the generated combined data into HDD 116. Combined data 45 is thus stored in HDD 116. Combined data 45 includes link information for identifying an element and an ordinal rank. Combined data 45 does not include an element itself but includes link information for identifying an element, and therefore the amount of data is small. Thus, the storage region of HDD 116 can be used effectively.

FIG. 5 shows an exemplary format of combined data. Referring to FIG. 5, combined data 45 includes user identification information, N link information, and the ordinal ranks of elements corresponding to the respective link information. The link information is information for identifying an element.

FIG. 6 shows an exemplary configuration of link information. The link information includes file identification information (data identification information) for identifying a file including an element, and location information for identifying the whole or part of a file. Here, a file name is used as file identification information. The location information is information identifying the whole or part of a file and is, for example, a chapter number, a page number, a paragraph number, or the like. Here, the location information employs a chapter number to identify a part of a file, by way of example. Although here the link information is formed of file identification information and location information, it may be formed of only file identification information. Furthermore, in place of file identification information and location information, a pointer indicating the address of HDD 116 may be used.

Returning to FIG. 3, related information generation portion 17 generates a job ticket corresponding to combined data 45. The job ticket includes a print condition for printing combined data 45 and an inheritance flag. The print condition corresponding to combined data 45 includes a setting item unique to each of a plurality of elements and a general item common to a plurality of elements. When combined data 45 is designated by the user, related information generation portion 17 reads combined data 45 from HDD 116 and reads the job ticket corresponding to the file identified by the link information included in combined data 45 from HDD 116 according to the ordinal rank defined in combined data 45. Then, if the inheritance flags included in the read plurality of job tickets are set inherit, the print conditions included in the job tickets are set to setting values of unique items. If set to discard, a new setting value for a unique item is accepted and set. When the setting values of unique items for all the elements are set, the setting value of the general item is accepted, and the setting value of the general item is set. Then, a job ticket including setting values of a plurality of unique items respectively corresponding to a plurality of elements and a setting value of one general item in the combined data is generated and stored in HDD 116 in association with the combined data.

When an instruction to output combined data 45 is input to operation portion 115, output portion 19 reads combined data 45 from HDD 116 according to the instruction. Then, the file identified by the link information included in combined data 45 is read from HDD 116 according to the ordinal rank defined by combined data 45, and a part that is defined in the location information of the link information (referred to as "object" hereinafter) is extracted from the read file. In a case of output to display portion 114, output portion 19 displays the read object on display portion 114. On the other hand, in a case of printing by image forming portion 140, output portion 19 reads the job ticket associated with the designated combined data from HDD 116 and outputs the print condition included in the job ticket and the read object to image forming portion 140 to allow image forming portion 140 to form an image according to the print condition.

Change detection portion 31 determines whether or not an instruction to change any of file group 41 stored in HDD 116 is input. A change includes not only a change of part of a file but also a change as a whole and includes deletion and overwriting with the same file name. When the user inputs a change instruction to change a file to operation portion 115, change detection portion 31 accepts the file name of the file to be changed and the change instruction from operation portion 115 and determines that a change instruction has been input. When a change instruction is input, change detection portion 31 determines whether the changed file is an element (identified by the link information), and, if element, outputs the file name of the file to be changed to permission request portion 33, change portion 37 and copy portion 39 and outputs the change instruction to change portion 37.

Permission request portion 33 reads the combined data including the file name input from change detection portion 31 from HDD 116 and outputs the file name of the combined data to confirmation portion 35, change portion 37 and copy portion 39. Then, the user identified by the user identification information included in the read combined data is requested for permission for change. Specifically, an email address corresponding to user identification information is stored, so that an email including a file name of a file to be changed and a file name of combined data and a message to request permission to change the file to be changed is transmitted to the email address. If a plurality of combined data including the file name input from change detection portion 31 are stored, permission request portion 33 reads all of a plurality of combined data from HDD 116. Then, the user identified by the user identification information included in each of all the read combined data is requested for permission for change.

Confirmation portion 35 receives a reply which responds to the request by permission request portion 33. Specifically, a reply mail corresponding to the email transmitted by permission request portion 33 is received. In a case of a reply to permit a change, a permission signal is output to change portion 37. In a case of a reply not to permit a change, a non-permission signal is output to copy portion 39. The permission signal and the non-permission signal each include the file name of combined data.

Copy portion 39 receives the file name of a file to be changed from change detection portion 31, the file name of combined data from permission request portion 33, and the non-permission signal from confirmation portion 35. When a non-permission signal is input from confirmation portion 35, copy portion 39 copies the file having the file name to be changed and stores a file having a new file name into HDD 116. Then, the file name (file identification information) of the link information of the combined data identified by the file name of the combined data, which includes the file name of the file to be changed, is updated to the file name of the new file. Then, a permission signal is output to change portion 37.

Change portion 37 receives the file name of the file to be changed and the change instruction from change detection portion 31 and receives the permission signal from confirmation portion 35 or copy portion 39. On the condition that a permission signal is input from either confirmation portion 35 or copy portion 39, change portion 37 changes the file stored in HDD 116 and identified by the file name according to the change instruction.

Figure 7:
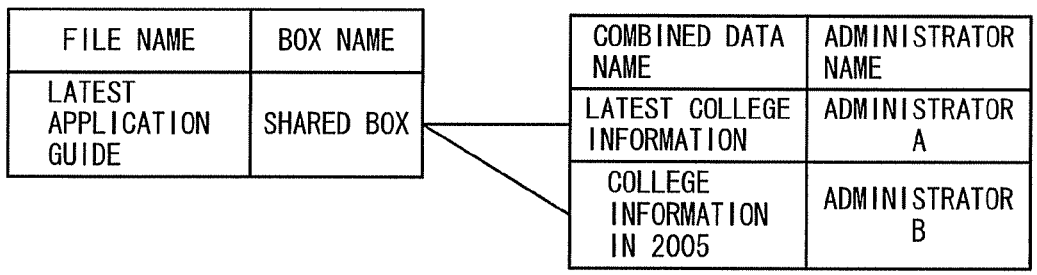
FIG. 7 shows an exemplary link between a file and combined data.

Here, a specific example of changing a file will be described. FIG. 7 shows an exemplary link between a file and combined data. Referring to FIG. 7, the file having a file name "latest application guide" is linked to two combined data, namely "latest college information" and "college information in 2005". Two combined data having combined data names "latest college information" and "college information in 2005" include the names of administrators (user identification information) "administrator A" and "administrator B", respectively.

As shown in FIG. 7, in the case where one file is liked with two combined data, when the file having the file name "latest application guide" is to be changed, two users with the administrator names "administrator A" and "administrator B" are requested to determine whether to permit a change. In this case, administrator A can permit a change of the file having the file name "latest application guide" while administrator B cannot permit a change of the file having the file name "latest application guide".

Figure 8:
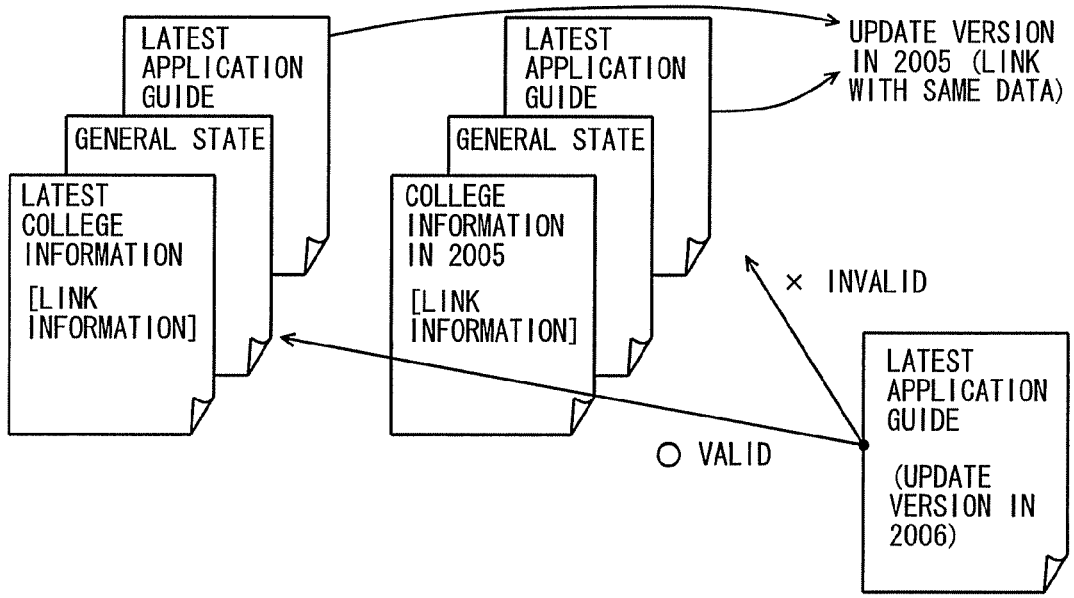
FIG. 8 shows a specific example in which a change in a file is not permitted.

FIG. 8 shows a specific example in which a change of a file is not permitted. In 2005, two combined data having combined data names "latest college information" and "college information in 2005" are generated, and later, for example, in 2006, the file with the file name "latest application guide" is updated with the contents of the application guide for 2006. In this case, this change is effective for the combined data name "latest college information" while the change is not effective for "college information in 2005". In such a case, before the file with the file name "latest application guide" is changed, a new file generated by copying that file, with a file name "application guide in 2005", is stored in HDD 116, and the file name "latest application guide" of the link information of the combined data with the combined data name "college information in 2005" is changed to the file name "application guide in 2005". Thereafter, the file having the file name "latest application guide" is changed.

Figure 9:
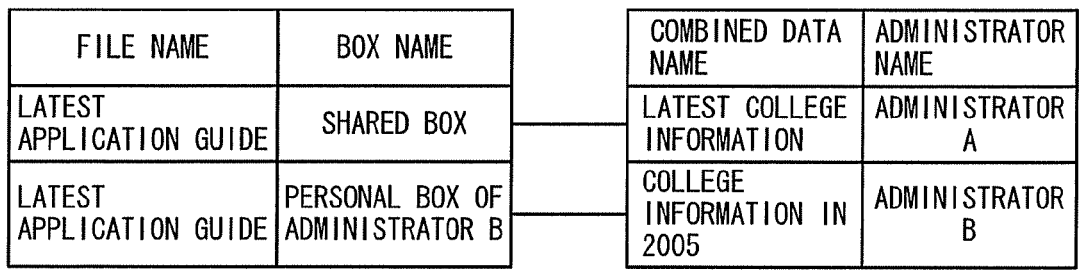
FIG. 9 shows an exemplary link between a file and combined data after a change is made in the file.

Here, BOX may be changed rather than a file name is changed. A specific example in which BOX is changed will be described. Here, the file with the file name "latest application guide" before change is stored in a shared BOX, by way of example. FIG. 9 shows an exemplary link between the file after change and combined data. Referring to FIG. 9, the file with the file name "latest application guide" generated by copying the file before change with the file name "latest application guide" stored in a shared BOX is stored in a personal BOX of administrator B. Then, the combined data having the combined data name "college information in 2005" is linked with the file having the file name "latest application guide" stored in the personal BOX. In addition, in the state where the file having the file name "latest application guide" stored in the shared BOX is kept linked with the combined data having the combined data name "latest college information", the file having the file name "latest application guide" is changed.

Figure 10:
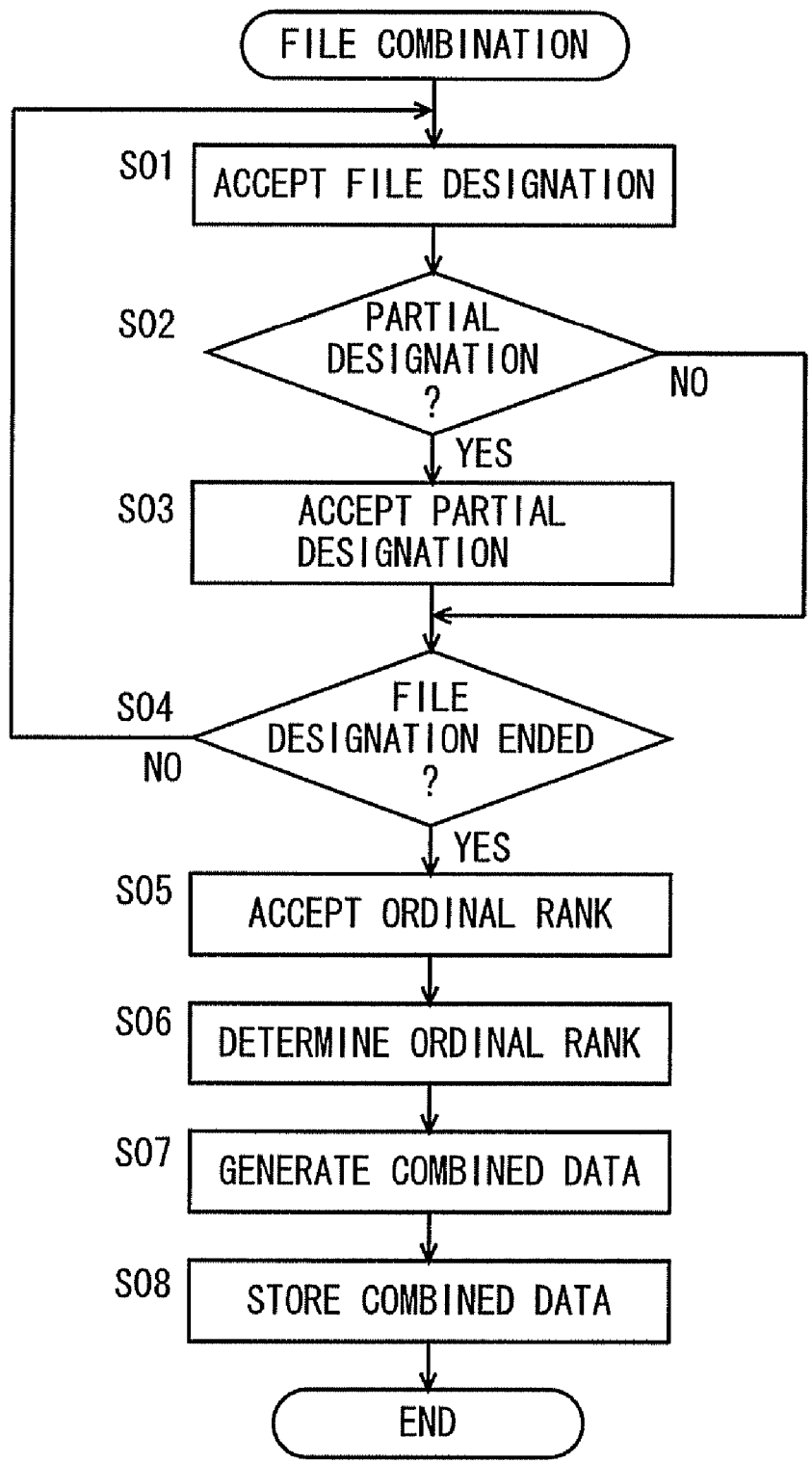
FIG. 10 is a flowchart illustrating an exemplary flow of a file combination process.

FIG. 10 is a flowchart illustrating an exemplary flow of a file combination process. The file combination process is a process performed by CPU 111 by CPU 111 of MFP 100 executing the data management program. Referring to FIG. 10, designation of a file stored in HDD 116 is accepted (step S01). Specifically, the file names of a plurality of files included in file group 41 stored in HDD 116 are displayed on display portion 114 in order to accept designation of a file name. Accordingly, an element is determined, and data identification information of link information which constitutes part of combined data is defined.

Then, it is determined whether or not partial designation to designate part of the designated file is accepted (S02). The file designated in step S01 is read from HDD 116, and when the user inputs an operation to designate a part of the displayed file to operation portion 115, the partial designation is detected. Then, the location in the file of the designated part (object) of the file is accepted (step S03). The location information of the link information which constitutes a part of combined data is thus defined. In this example, one object is extracted from one file. However, for example, a plurality of objects, for example, as Chapter 1 and Chapter 5 may be extracted from one file. In the case where step S03 is not executed, a mark indicating the whole of the file is set in the location information.

In step S04, it is determined whether or not the file designation operation is completed. It is determined whether a completion button included in operation portion 115 is pressed or not. If the file designation operation is completed, the process proceeds to step S05. If not, the process returns to step S01 in order to combine a plurality of files.

In step S05, the ordinal rank of the object defined by the whole or part of the designated file is accepted. A list of file names of the designated files are displayed, and when the user inputs an operation to rearrange the file names to operation portion 115, the rearranged file names are displayed and the arrangement order of the file names as finally rearranged is accepted. Then, based on the arrangement order, the respective ordinal ranks of a plurality of objects are determined (step S06).

Then, combined data is generated (step S07). Specifically, combined data is generated which includes the user identification information of the user who operates MFP 100, a plurality of link information, and the ordinal ranks. The user identification information is the user identification information input for user authentication when the user logs in to MFP 100. Each of a plurality of link information is information to specify an object and specifically includes the file name accepted in step S01 and the location information accepted in step S03. Furthermore, the ordinal rank defines the ordinal rank of an object, which is determined in step S06 for each object.

In step S08, the generated combined data is stored in HDD 116. The process then ends.

Figure 11:
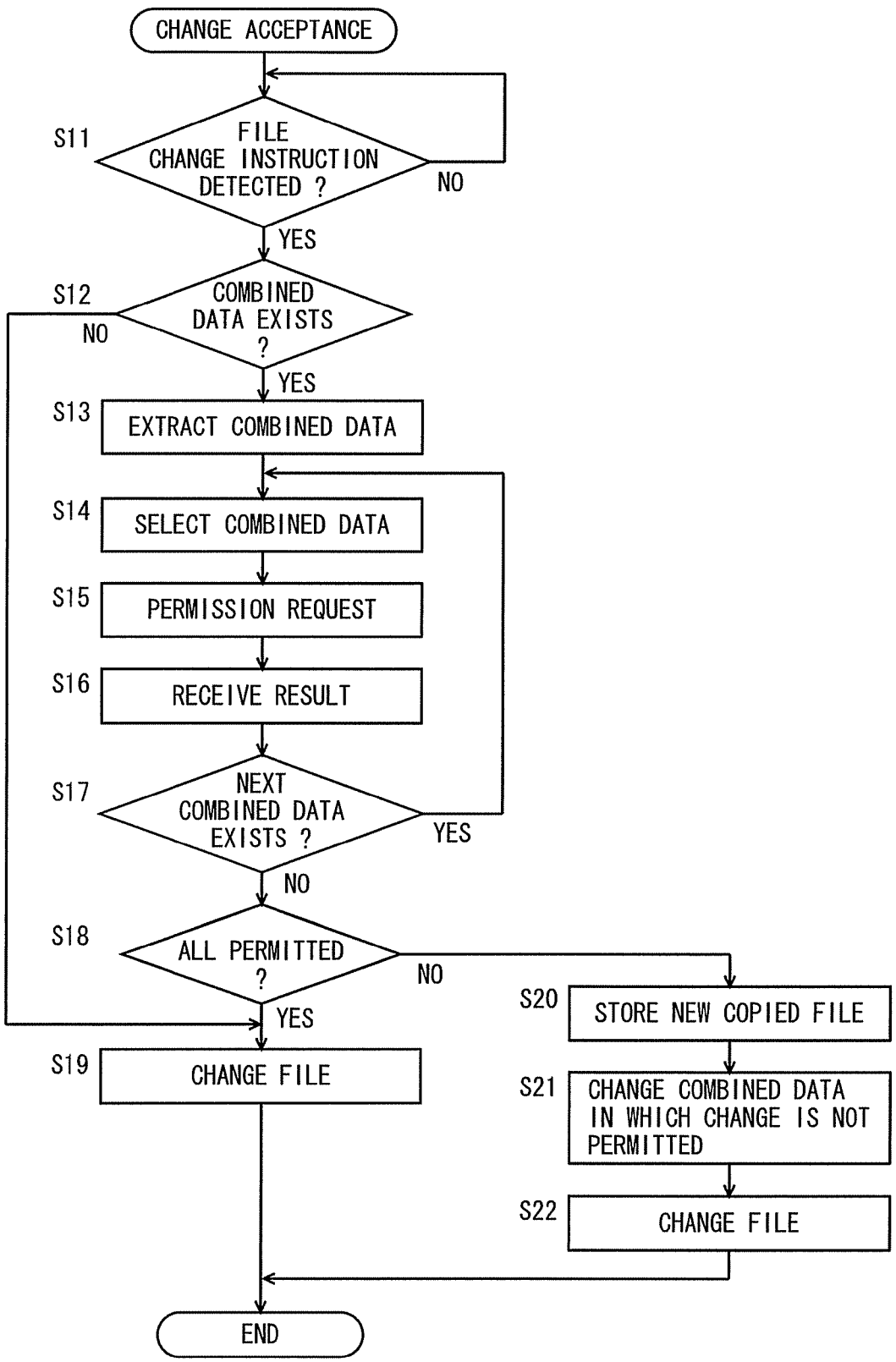
FIG. 11 is a flowchart illustrating an exemplary flow of a change process.

FIG. 11 is a flowchart illustrating an exemplary flow of a change process. The change process is a process performed by CPU 111 by CPU 111 of MFP 100 executing the data management program. Referring to FIG. 11, it is determined whether or not a change instruction to change a file stored in HDD 116 is accepted. The process stands by until a change instruction is accepted (NO in step S11), and if a change instruction is accepted (YES in step S11), the process proceeds to step S12. In other words, the change process is a process performed on condition that a change instruction is accepted. The change instruction includes designation of a file name of a file to be changed and a change content. The change content includes whether to add, change or deletion and the contents to be added/changed in the case of addition or change.

In step S12, it is determined whether or not there exists the combined data linked with the file to be changed. Specifically, it is determined whether or not combined data including the file name of the file to be changed is stored in HDD 116. If such combined data exists, the process proceeds to step S13. If not exist, the process proceeds to step S19. In step S19, the file identified by the file name included in the change instruction is changed according to the change content under the instruction detected in step S11, and the process then ends. This is because if no linked combined data exists, there exists no target in which the change should be reflected.

In step S13, all of combined data including the file name of the file to be changed are extracted. Next, one of the extracted combined data is selected as a target to be processed (step S14). Then, a permission request is transmitted (step S15). Specifically, an email for requesting permission for change is transmitted to the user identified by the user identification information included in the combined data as a target to be processed. An email including the file name of the file to be changed, the file name of combined data, and a message requesting permission to change the file to be changed is transmitted to the email address corresponding to the user identification information.

Then, a result for the permission request is received (step S16). A reply in response to the transmission of the permission request is received. A replay mail corresponding to the email transmitted in step S15 is received. The reply indicates either to permit a change or not to permit. The reply is stored for each combined data, and the process proceeds to step S17.

In step S17, it is determined whether or not combined data as the next target to be processed exists. If unprocessed combined data exists among the combined data extracted in step S13, the process returns to step S14. If not exist, the process proceeds to step S18. In step S18, it is determined whether or not all of the replies indicate permission to change. If all of the replies indicate to permit a change, the process proceeds to step S19. If even one reply indicates not to permit a change, the process proceeds to step S20. In step S19, the file is changed under the change instruction detected in step S11. Accordingly, the contents of the file are changed in combined data linked with the file to be changed. Therefore, only by changing a file, the change can be reflected in all of the combined data linked to that file. In addition, since the user who has generated combined data is asked whether or not a change would be reflected, such inconvenience in that combined data is changed without the user being aware of it can be prevented.

In step S20, the file to be changed is copied and a file with a new file name is stored. Then, combined data in which a change is not permitted is changed (step S21). As for the combined data corresponding to the reply indicating not to permit a change, of the replies stored corresponding to the combined data, the file name of the file to be changed in the link information of that combined data is updated to the file name of the new file produced as a copy in step S20. The process then proceeds to step S22.

In step S22, the file identified by the file name included in the change instruction is changed under the change instruction detected in step S11 (step S22), and the process then ends. Accordingly, the contents of the file are changed in the combined data linked with the file to be changed. As a result, the change of the changed file can be reflected in the combined data in which a change is permitted.

Figure 12:
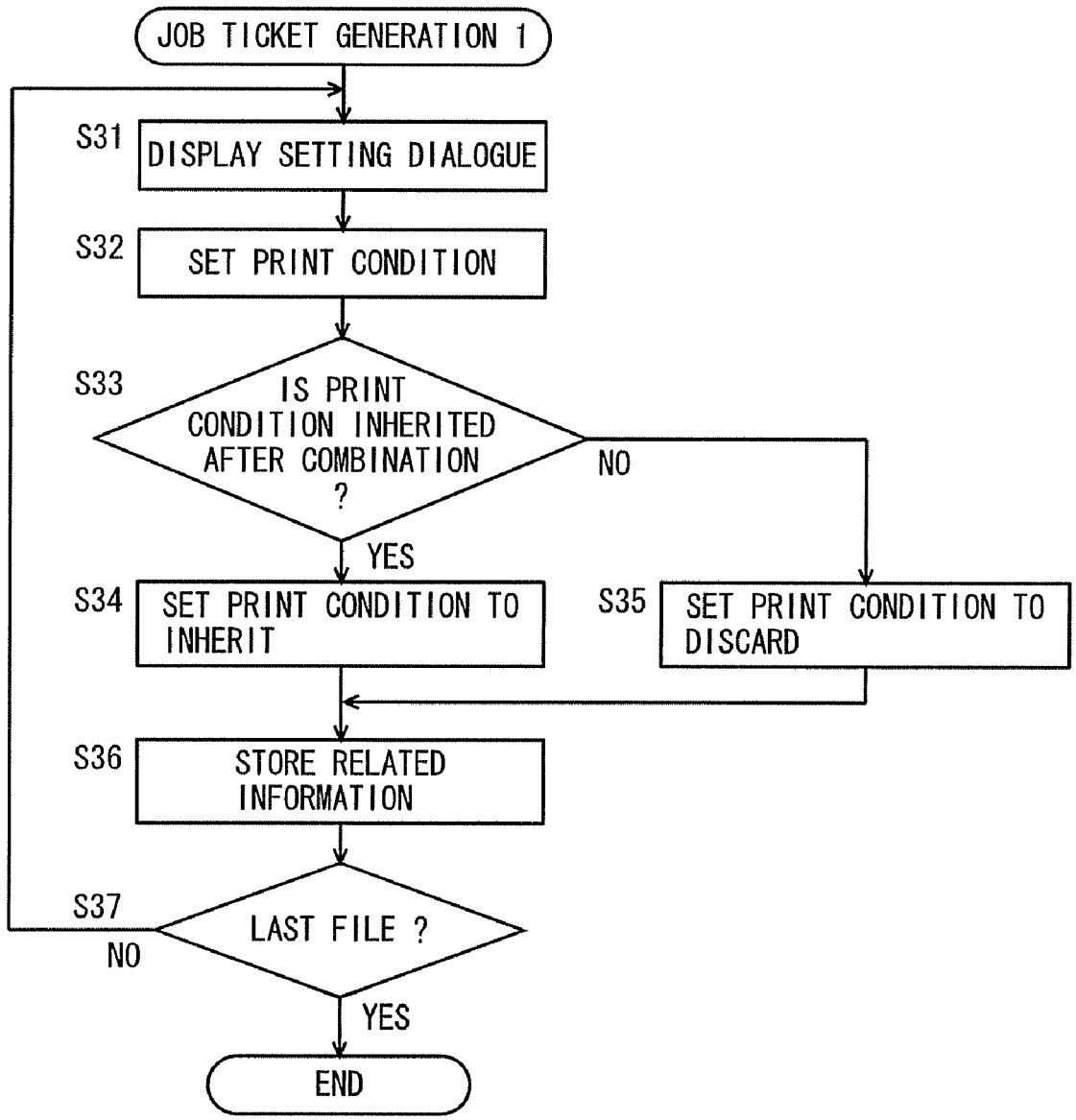
FIG. 12 is a first flowchart illustrating an exemplary flow of a job ticket generation process.

FIG. 12 is a first flowchart illustrating an exemplary flow of a job ticket generation process. This job ticket generation process is a process performed by CPU 111 by CPU 111 of MFP 100 executing the data management program. The job ticket generation process illustrated in the first flowchart is a process of generating a job ticket corresponding to a file, and specifically, generating a job ticket of a file for which job ticket has not been generated in file group 41 stored in HDD 116.

Referring to FIG. 12, CPU 111 allows a setting dialogue box for setting a print condition to appear on display portion 114. When the user inputs a print condition to operation portion 115 according to the setting dialog box, the print condition is accepted from operation portion 115 and is then set (step S32). Specifically, the accepted print condition is set in the job ticket. Then, it is determined whether or not the print condition is to be inherited after combination (step S33). The determination is based on which of an item "inherit" and an item "discard" displayed in the setting dialog is selected.

FIG. 13 shows an exemplary setting dialog box. Referring to FIG. 13, in the setting dialog box, a file name is displayed in an item of document name, and a setting value is displayed for each function in an item of print conditions. In addition, in a region for setting whether to inherit the print conditions, an item "inherit" and an item "discard" are displayed, and an exclusively selective radio button is displayed on the side of each item. In the figure, the item "inherit" is selected. When a button represented with characters "OK" is specified in this state, the setting values of the print conditions are finalized and the item "inherit" is selected.

Returning to FIG. 12, if the item "inherit" is selected in the setting dialog box, it is determined that the print conditions are inherited after combination (YES in step S33), and the process proceeds to step S34. If the item "discard" is checked, it is determined that the print conditions are not inherited after combination (NO in step S33), and the process proceeds to step S35.

In step S34, the setting for inheriting the print conditions set in step S32 is done, and the process proceeds to step S36. Specifically, the inheritance flag of the job ticket is set to inherit (ON). On the other hand, in step S35, the setting for not inheriting the print conditions set in step S32 is done (step S35), and the process proceeds to step S36. Specifically, the inheritance flag of the job ticket is set to discard (OFF).

In step S36, the job ticket is stored in HDD 116 in association with the file. Then, in the next step S37, it is determined whether or not the file is the last one for which job ticket is to be generated. If the last file, the process ends, and if not, the process returns to step S31.

Figure 14:
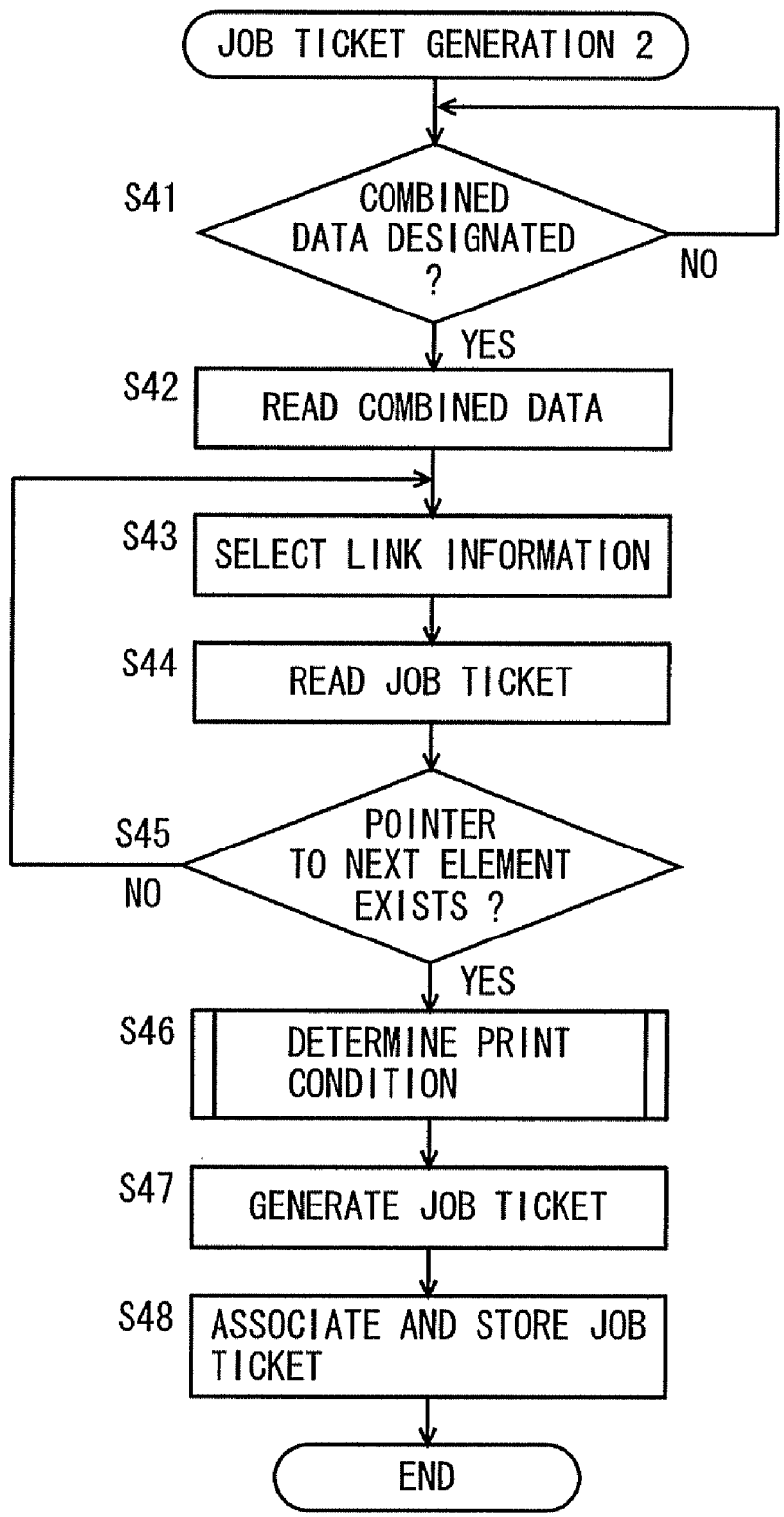
FIG. 14 is a second flowchart illustrating an exemplary flow of a job ticket generation process.

FIG. 14 is a second flowchart illustrating an exemplary flow of a job ticket generation process. This job ticket generation process is a process performed by CPU 111 by CPU 111 of MFP 100 executing the data management program. The job ticket generation process illustrated in the second flowchart is a process of generating a job ticket corresponding to combined data, and specifically generating a job ticket corresponding to combined data stored in HDD 116.

Referring to FIG. 14, CPU 111 determines whether or not combined data is designated. A list of file names of combined data stored in HDD 116 is displayed on display portion 114, and when specification of one of the displayed file names is accepted, that file name is accepted. When the file name is accepted, it is determined that the combined data having that file name is designated. The process stands by until a file name is accepted (NO in step S41). When a file name is accepted, the process proceeds to step S42.

In step S42, the combined data having the file name accepted in step S41 is read from HDD 116. Then, the link information having the first ordinal rank of the read combined data is selected. Then, the job ticket corresponding to the file having the file name included in the selected link information is read from HDD 116 (step S44). The job ticket includes a setting value as a print condition for printing the file.

In step S45, it is determined whether or not there exists the link information having the next ordinal rank. If the link information having the next ordinal rank exists, the process returns to step S43. If not exist, the process proceeds to step S46 to obtain the print conditions for printing the file having the next ordinal rank.

In step S46, a print condition determination process is performed. The print condition determination process which will be described later is a process of determining a setting value of a print condition for combined data as a whole.

Then, a job ticket corresponding to combined data is generated (step S47). Specifically, the setting value of a print condition determined in step S46 is set in a job ticket. Then, the generated job ticket is associated with the combined data designated in step S41 and is then stored in HDD 116.

Figure 15:
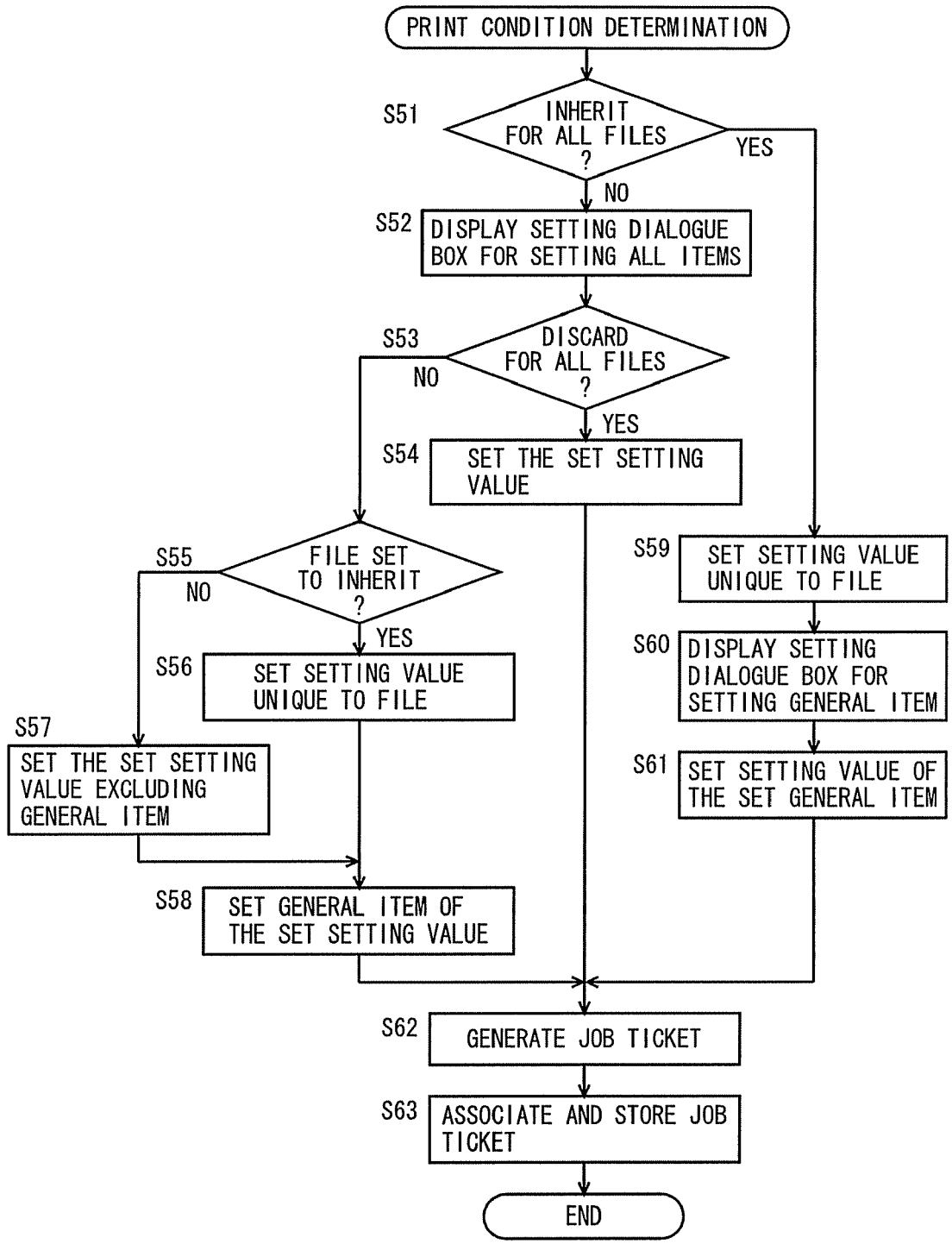
FIG. 15 is a flowchart illustrating an exemplary of a print condition determination process.

FIG. 15 is a flowchart illustrating an exemplary flow of a print condition determination process. The print condition determination process is a process performed in step S46 in FIG. 14. Referring to FIG. 15, it is determined whether or not the print conditions are set to inherit in all the files (step S51). It is determined whether or not the inheritance flag of the job ticket corresponding to the file is set to inherit (ON) in all the files. If the inheritance flags are all set to inherit (ON), the process proceeds to step S59. If even one is set to discard (OFF), the process proceeds to step S52.

In step S52, the setting dialog box for setting all the items of the print conditions is displayed on display portion 114. FIG. 16 shows an exemplary setting dialog box for setting all the items. All the items that can be set as print conditions are displayed so that the setting values of these items can be set. Here, the setting value includes a setting of not using the function corresponding to the item. For example, if "off" indicating not to use is set as a setting value for the item corresponding to a stapling function of driving a staple, the setting of not performing the stapling function is done.

Returning to FIG. 15, in step S53, it is determined whether or not the print conditions are set to discard in all of the files. It is determined whether or not the inheritance flag of the job ticket corresponding to the file is set to discard (OFF) in all of the files. If the inheritance flags are all set to discard (OFF), the process proceeds to step S54. If even one is set to inherit (ON), the process proceeds to step S55.

In step S54, the setting values of all the items set in step S52 are set, and the process proceeds to step S62.

In step S55, the process branches depending on the file having the print conditions set to inherit or the file having the print conditions set to discard. For the file having the inheritance flag set to inherit (ON), the process in step S56 is performed, and for the file having the inheritance flag set to discard (OFF), the process in step S57 is performed.

In step S56, for the print condition for the file set to inherit, the setting value unique to that file is set, and the process proceeds to step S58. The setting value unique to the file is the setting value of the print condition included in the job ticket corresponding to the file. In step S57, of the setting values of all of the items set in step S52, the setting values of the items excluding the general item are set, and the process proceeds to step S58. The general item is, for example, an item corresponding to a function that can be performed for the entire output sheets, such as perfect binding of covering the entire output sheet, of the post-processing functions.

In step S58, of the setting values of all the items set in step S52, the setting value of the general item is set, and the process proceeds to step S62.

On the other hand, in the case where the process proceeds to step S59, the print conditions are set to inherit for all of the files. Thus, in step S59, for each of all of the files, the setting value unique to the file is set, and the process proceeds to step S60. In step S60, the setting dialog box for setting the general item is displayed on display portion 114. Accordingly, the setting value is set in the general item of the print condition. Then, the setting value of the set general item is set (step S61), and the process proceeds to step S62.

In step S62, a job ticket including the set print conditions is generated. Next, the generated job ticket is associated with the combined data and then stored in HDD 116 (step S63), and the process returns to the job ticket generation process shown in FIG. 14.

Figure 17:
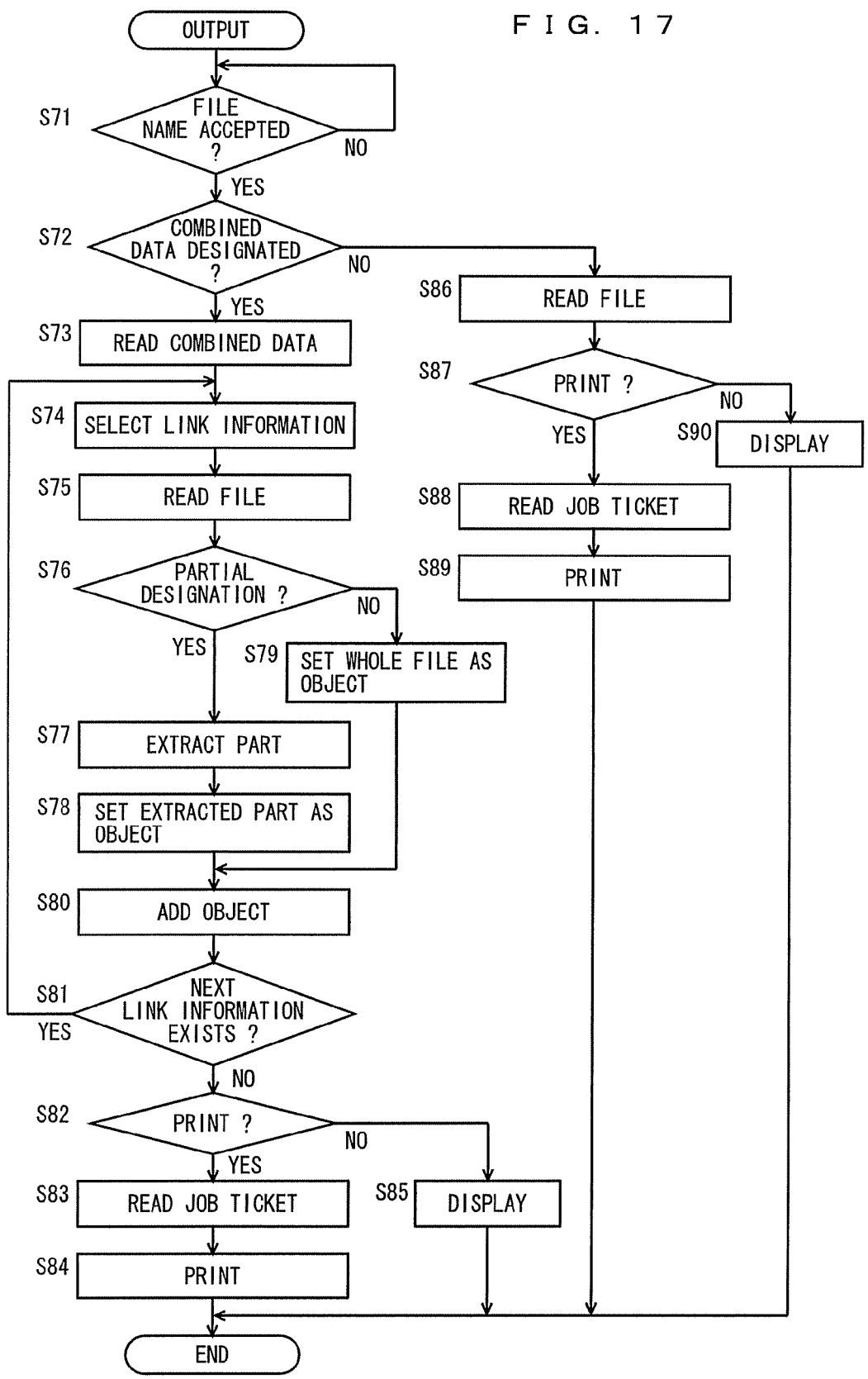
FIG. 17 is a flowchart illustrating an exemplary flow of an output process.

FIG. 17 is a flowchart illustrating an exemplary flow of an output process. The output process is a process performed by CPU 111 by CPU 111 of MFP 100 executing the data management program. Referring to FIG. 17, it is determined whether or not a file name is designated. The file names of a plurality of files included in file group 41 stored in HDD 116 and the file names of combined data 45 are displayed in a list. When the user designates any one of file names using operation portion 115, that file name is accepted. In a case of a remote operation from a personal computer (PC) connected through a network, the file name list data is transmitted rather than being displayed on display portion 114, and the file name designated by the user of PC is received, whereby the file name is accepted. The process stands by until a file name is accepted (NO in step S71). When a file name is accepted (YES in step S71), the process proceeds to step S72. In other words, the output process is a process performed by externally accepting a file name.

In step S72, it is determined whether or not the file having the accepted file name is combined data. If combined data, the process proceeds to step S73, and if not, the process proceeds to step S86.

In step S73, the combined data having the designated file name is read from HDD 116. Then, the link information with the first ordinal rank included in the combined data is selected (step S74). The file identified by the file name included in the selected link information is read from HDD 116.

In step S76, whether partial designation or not is determined. Here, it is determined whether the location information of the link information is set to the whole. If the location information is not set to the whole, it is determined that partial designation is set. If the location information is set to partial designation (YES in step S76), the process proceeds to step S77. If not, the process proceeds to step S79. In step S77, that part which is identified by the location information included in the link information is extracted from the file. Then, the extracted part is set as an object (step S78), and the process proceeds to step S80. In step S80, the set object is added to an output target.

If it is determined that partial designation is not set in step S76, the whole file is set as an object (step S79), and the process proceeds to step S80. In step S80, the set object is added to an output target.

In step S81, it is determined whether or not there exists the next link information to be processed. If unprocessed link information exists, the process returns to step S74. If not exist, the process proceeds to step S82.

In step S82, it is determined whether or not print is specified as an output method. If print output is specified, the process proceeds to step S83. If not, the process proceeds to step S85. In step S83, the job ticket corresponding to the combined data having the file name accepted in step S71 is read, and the process proceeds to step S84. In step S84, the object generated in step S80 is printed according the print conditions included in the job ticket, and the process then ends.

On the other hand, in step S85, the object generated in step S80 is displayed on display portion 114. Here, if a file name is received through a network in step S71, the object is transmitted to the sender that has transmitted the file name.

On the other hand, in step S86, the file having the file name accepted in step S71 is read from HDD 116. Then, it is determined whether or not print is specified as an output method. If a print output is specified (YES in step S87), the job ticket corresponding to the file having the file name accepted in step S71 is read (step S88), and the file is printed according to the print conditions included in the job ticket (step S89). The process then ends. If print is not specified as an output method (NO in step S87), the file having the file name accepted in step S71 is displayed on display portion 114 (step S90). Here, if a file name is received through a network in step S71, the file is transmitted to the sender that has transmitted the file name.

As described above, in MFP 100 in the present embodiment, combined data is stored, which includes link information for specifying, as an element, all or a part of at least one of a plurality of files stored in advance and defines the ordinal rank of the element. Therefore, the element specified by the link information is read according to the ordinal rank defined in the combined data, so that any data among a plurality of data can be output in any given order. In addition, when a file is changed, the changed file is read in a stage in which combined data is output, so that the combined data can be changed virtually without being changed. This facilitates an operation for data update.

Furthermore, before any of files is changed, an email for asking for permission for change is transmitted to the user identified by the user identification information included in combined data linked with the whole or part of the file to be changed, and on condition that a reply to permit is accepted from the user, the file to be changed is changed under a change instruction. Therefore, the contents of combined data can be prevented from being changed without the user being aware of it.

On the other hand, if permission is not obtained, a new file is generated by copying the file before change, and the file identification information included in the link information of combined data is changed to file identification information for identifying a new file, so that the contents of the combined data before changing the file can be maintained after changing the file. Therefore, even when one user permits a change while another user does not permit, the combined data can reflect the intentions of both of them.

In the foregoing embodiment, MFP 100 has been described as an exemplary data management apparatus. However, the present invention is not limited to MFP 100, and, for example, a scanner, a printer, a facsimile, a personal computer, and the like may be used as long as the apparatus can store and process a plurality of data. It is needless to say that the present invention can be understood as a data management method and a data management program causing a computer to perform the processes shown in FIG. 10-FIG. 12, FIG. 14, FIG. 15, and FIG. 17.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data management apparatus comprising:
a processor, wherein the processor comprises:
an element determination portion to determine respectively a plurality of data stored beforehand, as element data;
an ordinal rank determination portion to determine ordinal ranks of determined plurality of said element data, wherein the ordinal rank determines an order in which identification information of the element data are displayed; and
a combined data generation portion to generate and store combined data for a user in an electronic memory, which combined data includes a plurality of pieces of link information specifying at least part of each of said determined plurality of element data and defines an ordinal rank of each of said plurality of pieces of the link information in accordance with said determined ordinal ranks;
a duplicating portion to duplicate the at least part of each of said determined plurality of element data that is specified in the combined data before the at least part of each of said determined plurality of element data that is specified in the combined data is changed without a permission from the user.

2. The data management apparatus according to claim 1, wherein said combined data generation portion generates combined data further including user identification information for identifying a user, and said data management apparatus further comprising a change notification portion, when a change instruction to change any of plurality of said element data is accepted, to read said combined data including said link information specifying at least part of said instructed element data as a target to be changed and give a notification to a user identified by said user identification information included in the read combined data.

3. The data management apparatus according to claim 2, further comprising a second change portion to generate new element data by copying said element data before change and changing data identification information included in the link information included in read said combined data to data identification information for identifying said new element data, in a case where permission by the user receiving said notification is not accepted.

4. The data management apparatus according to claim 1, further comprising an output portion to read and output a part specified by said link information from plurality of said element data, according to said ordinal rank defined in said combined data, when said combined data is designated.

5. The data management apparatus according to claim 4, wherein each of plurality of said element data is associated with related information including a print condition, and said output portion includes a reading portion to read all of the related information associated with all of said element data specified by the link information included in designated said combined data, a general setting acceptance portion to accept a setting of a print condition that can be set for designated said combined data as a whole, a related information generation portion to generate new related information including a print condition included in each of read all said related information and set said print condition, and an association portion to associate generated said new related information with designated said combined data.

6. The data management apparatus according to claim 5, wherein said related information includes definition information defining whether a print condition is valid or invalid, said data management apparatus further comprising an individual setting acceptance portion to accept a setting of a new print condition for said element data which is associated with said related information including definition information defining invalid, of read said related information.

7. The data management apparatus according to claim 4, wherein each of plurality of said element data is associated with related information including a print condition, said related information includes definition information defining whether a print condition is valid or invalid, and said output portion includes a reading portion to read all of said related information associated with all of said element data specified by the link information included in said combined data, a general setting acceptance portion to accept a setting of a print condition common to all of parts specified by said link information included in said combined data, in a case where all of read said related information include definition information defining invalid, a related information generation portion to generate related information including set said print condition, and an association portion to associate generated said related information with generated said combined data.

8. The data management apparatus according to claim 1, wherein said link information includes a file name and location information indicating a location in a file.

9. A data management apparatus comprising:
a processor, wherein the processor comprises:
an element determination portion to determine respectively a plurality of data stored beforehand, as element data;
an ordinal rank determination portion to determine ordinal ranks of determined plurality of said element data;
a combined data generation portion to generate and store combined data in an electronic memory, which combined data includes a plurality of pieces of link information specifying at least part of each of said determined plurality of element data and defines an ordinal rank of each of said plurality of pieces of the link information in accordance with said determined ordinal ranks;
wherein said combined data generation portion generates combined data further including user identification information for identifying a user, and said data management apparatus further comprising a change notification portion, when a change instruction to change any of plurality of said element data is accepted, to read said combined data including said link information specifying at least part of said instructed element data as a target to be changed and give a notification to a user identified by said user identification information included in the read combined data; and
a first change portion to change said element data as a target to be processed, according to said change instruction, on condition that permission by the user receiving said notification is accepted.

10. A data management method comprising the steps of:
determining a plurality of data stored beforehand, as element data;
determining ordinal ranks of determined plurality of said element data, wherein the ordinal rank determines an order in which identification information of the element data are displayed;
generating combined data for a user which includes link information for specifying at least part of each of determined plurality of said element data and defines an ordinal rank of the link information;
storing said combined data; and
reading and outputting a part specified by said link information from plurality of said element data, according to an ordinal rank defined by said combined data, when stored said combined data is designated;
duplicating the at least part of each of said determined plurality of element data that is specified in the combined data before the at least part of each of said determined plurality of element data that is specified in the combined data is changed without a permission from the user.

11. The data management method according to claim 10, wherein
in said step of generating combined data, combined data further including user identification information for identifying a user is generated, said data management method further comprising the step of reading said combined data including said link information specifying at least part of said element data as a target to be changed, and giving a notification to a user identified by said user identification information included in the read combined data, when a change instruction to change any of plurality of said element data is accepted.

12. The data management method according to claim 11, further comprising the step of generating new element data by copying said element data before change and changing data identification information included in the link information included in read said combined data to data identification information for identifying said new element data, in a case where permission by the user receiving said notification is not accepted.

13. The data management method according to claim 10, further comprising the step of reading and outputting a part specified by said link information from plurality of said element data, according to said ordinal rank defined in said combined data, when said combined data is designated.

14. The data management method according to claim 13, wherein each of plurality of said element data is associated with related information including a print condition, and said step of outputting includes the steps of reading all of the related information associated with all of said element data specified by the link information included in designated said combined data, accepting a setting of a print condition that can be set for designated said combined data as a whole, generating new related information including a print condition included in each of read all said related information and set said print condition, and associating generated said new related information with designated said combined data.

15. The data management method according to claim 14, wherein said related information includes definition information defining whether a print condition is valid or invalid, said data management method further comprising the step of accepting a setting of a new print condition for said element data which is associated with said related information including definition information defining invalid, of read said related information.

16. The data management method according to claim 13, wherein each of plurality of said element data is associated with related information including a print condition, said related information includes definition information defining whether a print condition is valid or invalid, and said step of outputting includes the steps of reading all of said related information associated with all of said element data specified by the link information included in said combined data, accepting a setting of a print condition common to all of parts specified by said link information included in said combined data, in a case where all of read said related information include definition information defining invalid, generating related information including set said print condition, and associating generated said related information with generated said combined data.

17. The data management method according to claim 10, wherein said link information includes a file name and location information indicating a location in a file.

18. The data management method according to claim 10, further comprising:

changing the combined data to update link information to the duplicated at least part of each of said determined plurality of element data when said determined plurality of element data is changed without a permission from the user.

19. A data management method comprising the steps of:

determining a plurality of data stored beforehand, as element data;

determining ordinal ranks of determined plurality of said element data;

generating combined data which includes link information for specifying at least part of each of determined plurality of said element data and defines an ordinal rank of the link information;

storing said combined data;

reading and outputting a part specified by said link information from plurality of said element data, according to an ordinal rank defined by said combined data, when stored said combined data is designated;

wherein in said step of generating combined data, combined data further including user identification information for identifying a user is generated, said data management method further comprising the step of reading said combined data including said link information specifying at least part of said element data as a target to be changed, and giving a notification to a user identified by said user identification information included in the read combined data, when a change instruction to change any of plurality of said element data is accepted; and further comprising the step of changing said element data as a target to be processed, according to said change instruction, on condition that permission by the user receiving said notification is accepted.

20. A nontransitory computer readable medium encoded with a data management program causing a computer to perform the steps of:

determining a plurality of data stored beforehand, as element data;

determining ordinal ranks of determined plurality of said element data, wherein the ordinal rank determines an order in which identification information of the element data are displayed;

generating combined data for a user which includes link information for specifying at least part of each of determined plurality of said element data and defines an ordinal rank of the link information;

storing said combined data; and reading and outputting a part specified by said link information from plurality of said element data, according to an ordinal rank defined by said combined data, when stored said combined data is designated;

duplicating the at least part of each of said determined plurality of element data that is specified in the combined data before the at least part of each of said determined plurality of element data that is specified in the combined data is changed without a permission from the user.

* * * * *